US009672218B2

(12) United States Patent
Lillibridge et al.

(10) Patent No.: US 9,672,218 B2
(45) Date of Patent: Jun. 6, 2017

(54) SYSTEMS AND METHODS FOR DATA CHUNK DEDUPLICATION

(75) Inventors: Mark D. Lillibridge, Mountain View, CA (US); Kave Eshghi, Los Altos, CA (US); Mark R. Watkins, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 231 days.

(21) Appl. No.: 14/364,440

(22) PCT Filed: Feb. 2, 2012

(86) PCT No.: PCT/US2012/023649
§ 371 (c)(1),
(2), (4) Date: Jun. 11, 2014

(87) PCT Pub. No.: WO2013/115822
PCT Pub. Date: Aug. 8, 2013

(65) Prior Publication Data
US 2014/0344229 A1    Nov. 20, 2014

(51) Int. Cl.
*G06F 17/30* (2006.01)
*G06F 3/06* (2006.01)

(52) U.S. Cl.
CPC ........ *G06F 17/30159* (2013.01); *G06F 3/067* (2013.01); *G06F 3/0608* (2013.01); *G06F 3/0641* (2013.01)

(58) Field of Classification Search
CPC ............. G06F 17/30159; G06F 3/0608; G06F 3/0641; G06F 3/067
See application file for complete search history.

(56) References Cited

U.S. PATENT DOCUMENTS

| 5,805,919 | A  | 9/1998 | Anderson |
| 7,747,584 | B1 | 6/2010 | Jernigan, IV |
| 7,844,581 | B2 | 11/2010 | Dubnicki et al. |

(Continued)

FOREIGN PATENT DOCUMENTS

| CN | 101379465 A | 3/2009 |
| CN | 102378969 A | 3/2012 |

(Continued)

OTHER PUBLICATIONS

HP, "Maximize storage efficiency across the enterprise", Dec. 2011, pp. 1-12.*

(Continued)

*Primary Examiner* — Apu Mofiz
*Assistant Examiner* — Jared Bibbee
(74) *Attorney, Agent, or Firm* — Conley Rose, P.C.

(57) ABSTRACT

A method includes receiving information about a plurality of data chunks and determining if one or more of a plurality of back-end nodes already stores more than a threshold amount of the plurality of data chunks where one of the plurality of back-end nodes is designated as a sticky node. The method further includes, responsive to determining that none of the plurality of back-end nodes already stores more than a threshold amount of the plurality of data chunks, deduplicating the plurality of data chunks against the back-end node designated as the sticky node. Finally, the method includes, responsive to an amount of data being processed, designating a different back-end node as the sticky node.

14 Claims, 4 Drawing Sheets

(56) References Cited

U.S. PATENT DOCUMENTS

| | | | |
|---|---|---|---|
| 8,190,742 | B2 | 5/2012 | Fineberg et al. |
| 8,751,448 | B1* | 6/2014 | Douglis ............... G06F 3/0641 707/626 |
| 2004/0064693 | A1 | 4/2004 | Pabla et al. |
| 2005/0182780 | A1 | 8/2005 | Forman et al. |
| 2005/0283500 | A1 | 12/2005 | Eshghi et al. |
| 2006/0129875 | A1 | 6/2006 | Barrall |
| 2007/0088703 | A1 | 4/2007 | Kasiolas et al. |
| 2007/0250674 | A1 | 10/2007 | Fineberg et al. |
| 2008/0294696 | A1* | 11/2008 | Frandzel ............... G06F 3/0608 |
| 2009/0113167 | A1 | 4/2009 | Camble et al. |
| 2009/0132619 | A1* | 5/2009 | Arakawa ............... G06F 3/0605 |
| 2009/0193223 | A1* | 7/2009 | Saliba ............... G06F 3/0608 711/216 |
| 2009/0271454 | A1 | 10/2009 | Anglin et al. |
| 2010/0088296 | A1 | 4/2010 | Periyagaram et al. |
| 2010/0223441 | A1* | 9/2010 | Lillibridge ............ G06F 3/0608 711/165 |
| 2010/0235332 | A1* | 9/2010 | Haustein ........... G06F 17/30315 707/692 |
| 2010/0246709 | A1* | 9/2010 | Lillibridge ........ G06F 17/30988 375/295 |
| 2011/0040763 | A1 | 2/2011 | Lillibridge et al. |
| 2011/0055621 | A1 | 3/2011 | Mandagere et al. |
| 2011/0060759 | A1* | 3/2011 | Fienblit ............. G06F 17/30575 707/770 |
| 2011/0099351 | A1* | 4/2011 | Condict ............... G06F 3/0608 711/216 |
| 2011/0179250 | A1 | 7/2011 | Matsuzawa et al. |
| 2011/0184967 | A1 | 7/2011 | Reiter et al. |
| 2011/0231362 | A1* | 9/2011 | Attarde ............... G06F 11/3442 707/609 |
| 2011/0238635 | A1* | 9/2011 | Leppard ............ G06F 17/30159 707/693 |
| 2011/0246741 | A1* | 10/2011 | Raymond ......... G06F 17/30159 711/170 |
| 2011/0307447 | A1* | 12/2011 | Sabaa ................. H04L 67/2842 707/637 |
| 2011/0307659 | A1 | 12/2011 | Hans et al. |
| 2012/0016845 | A1* | 1/2012 | Bates ................... G06F 3/0608 707/692 |
| 2012/0030176 | A1 | 2/2012 | Gelson et al. |
| 2012/0047324 | A1 | 2/2012 | Wideman |
| 2012/0131025 | A1 | 5/2012 | Cheung et al. |
| 2012/0143715 | A1 | 6/2012 | Eshghi et al. |
| 2013/0086006 | A1* | 4/2013 | Colgrove ............. G06F 3/0688 707/692 |

FOREIGN PATENT DOCUMENTS

| | | |
|---|---|---|
| GB | 2470497 A | 11/2010 |
| WO | WO-2011006859 A1 | 1/2011 |
| WO | WO-2011053274 A1 | 5/2011 |
| WO | WO-2011/159322 | 12/2011 |

OTHER PUBLICATIONS

Biplob Debnath et al., "ChunkStash: Speeding Up Inline Storage Deduplication Using Flash Memory", Jun. 2010, pp. 1-15.*

Deepavali Bhagwat et al., "Extreme Binning: Scalable, Parallel Deduplication for Chunk-based File Backup", Jul. 6, 2009, IEEE, pp. 1-10.*

Lillibridge et al., "Sparse Indexing: Large Scale, Inline Deduplication Using Sampling and Locality", Feb. 24-27, 2009, pp. 4-13.*

ISR/WO PCT/US2012/035916, Jan. 31, 2013, 8 pps.

Lillibridge, M., Eshghi, K., Bhagwat, D., Deolalikar, V., Trezise, G., and Camble, P. Sparse Indexing: Large Scale, Inline Deduplication Using Sampling and Locality, Proceedings of 7th USENIX Conference on File and Storage Technologies (FAST '09) Feb. 2009.

Narang et al., "Real-Time Approximate Range Motif Discovery & Data Redundancy Removal Algorithm," EDBT 2011, Mar. 22-24, 2011, 12 p.

Wang et al., "Research on a Clustering Data De-Dedeuplication Mechanism based on Bloom Filter," South China University of Technology, Oct. 29-31, 2010, 5 p.

EMC2, "EMC Data Domain Global Deduplication Array, A Detailed Review," (Research Paper), White Paper, Jan. 31, 2011, 24 pages.

Extended European Search Report received in EP Application No. 12867467.8, Aug. 5, 2015, 9 pages.

Extended European Search Report received in EP Application No. 12876047.7, Nov. 19, 2015, 8 pages.

International Preliminary Report on Patentability received in PCT Application No. PCT/US2012/023649, Aug. 14, 2014, 5 pages.

International Preliminary Report on Patentability received in PCT Application No. PCT/US2012/035916, Nov. 13, 2014, 5 pages.

International Search Report & Written Opinion received in PCT Application No. PCT/US2012/035916, Jan. 31, 2013, 8 pages.

Dong. W. et al., "Tradeoffs in Scalable Data Routing for Deduplication Clusters," FAST, vol. 11, 2011, pp. 15-29, available at https://www.usenix.org/legacy/events/fast11/tech/full_papers/Dong.pdf.

Dong et al., "Tradeoffs in Scalable Data Routing for Deduplication Clusters," 15 p. FAST'11 Proceedings of the 9th USENIX Conference on File and Storage Technologies.

ISR/WO, PCT/US2012/023649, Oct. 23, 2012, 8 pps.

Zhu et al., "Avoiding the Disk Bottleneck in the Data Domain Deduplication File System," FAST '08: 6th USENIX Conference on File and Storage Technologies, pp. 269-282.

Aronovich, L. et al., "The Design of a Similarity Based Deduplication System," Proceedings of SYSTOR 2009: The Israeli Experimental Systems Conference, ACM, 2009, 14 pages.

Bhagwat, D. et al., "Extreme Binning: Scalable, Parallel Deduplication for Chunk-based File Backup," 2009 IEEE International Symposium on Modeling, Analysis & Simulation of Computer and Telecommunication Systems, 2009, 9 pages.

Bobbarjung, D. R. et al., "Improving Duplication Elimination in Storage Systems," ACM Transactions on Storage (TOS) 2.4, 2006, pp. 424-448.

Extended European Search Report received in EP Application No. 12876001.4, Nov. 19, 2015, 8 pages.

International Search Report & Written Opinion received in PCT Application No. PCT/US2009/062056, Jul. 26, 2010, 9 pages.

ISR/WO PCT/US2012/035917, Feb. 13, 2013, 9 pps.

Jain, N. et al., "TAPER: Tiered Approach for Eliminating Redundancy in Replica Synchronization," Proceedings of the 4th Conference on USENIX Conference on File and Storage Technologies, vol. 4, 2005, pp. 281-294.

Lillibridge, M. et al., "Sparse Indexing: Large Scale, Inline Deduplication Using Sampling and Locality," 7th USENIX Conference on File and Storage Technologies, Feb. 24-27, 2009, pp. 111-123.

Sadowski, C. et al., "SimHash: Hash-based Similarity Detection," 2007, 10 pages, retrieved on Apr. 10, 2014 at http://www.googlecode.com/sun/trunk/paper/SimHashwithBib.pdf.

Thwel et al., "An Efficient Indexing Mechanism for Data Deduplication," 2009 International Conference on the Current Trends in Information Technology (CTIT), Dubai, Dec. 15-16, 2009, pp. 1-5.

Won, Y. et al. "Efficient Index Lookup for De-duplication Backup System," 2008 IEEE International Symposium on Modeling, Analysis and Simulation of Computers and Telecommunication Systems, 2008, 3 pages.

* cited by examiner

SYSTEMS AND METHODS FOR DATA CHUNK DEDUPLICATION

BACKGROUND

Data deduplication is a data compression technique for eliminating redundant data and is particularly useful to improve storage utilization, for example when backing up large amounts of data on a regular basis. When using chunk-based inline deduplication for backup, a data stream to be backed up is broken up into smaller pieces (typically on the order of a few kilobytes) called "chunks" using a chunking algorithm and a hash is computed for each chunk (e.g., using an MD5 hash function or SHA hash function). The hash for a chunk to be backed up is looked up in one or more indexes and/or other data structures maintained by the system. If the system determines as a result that it already has a chunk with that hash, then that chunk is a duplicate of data already stored in the system and need not be stored again. Thus, the hash for each incoming chunk is looked up in one or more indexes and/or other data structures maintained by the system.

In order to limit the amount of expensive memory required while maintaining performance, complicated methods of indexing may be used in practice. In one example ("sparse indexing method"), the system maintains a "sparse index," which maps a small subset of hashes called "hooks" (e.g., one out of every 32 or 64 unique hashes) to an index with information about the chunk with that hook as well as chunks that occurred near that chunk in the past.

In another example ("Bloom filter method"), a Bloom filter tracks the hashes of chunks that are stored by the system and a full chunk index maps the hash of every chunk stored by the system to an index with information about the chunk with that hash as well as chunks that occurred near that chunk in the past. The full chunk index is only consulted when the Bloom filter determines that the input chunk has already been stored in order to reduce the number of accesses to the full chunk index.

A single node using one of the above-described methods provides acceptable performance for applications where the amount of data being backed up is low, or where high throughput is not needed. However, for enterprise-type applications where data backup requirements are much higher, employing multiple-node storage systems may be beneficial. One way to do this is to appropriately route incoming data between a number of mostly autonomous back-end nodes, each of which may be employing one of the above exemplary methods. Each batch of incoming data is deduplicated against only one back-end node under this architecture, so it is important to route similar batches of data to the same back-end node to ensure efficient deduplication to minimize the storage space impact of backing up data.

BRIEF DESCRIPTION OF THE DRAWINGS

For a detailed description of exemplary implementations, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

As used herein, the term "chunk" refers to a subset of a data stream that is produced using a chunking algorithm.

As used herein, the term "segment" refers to a group of chunks that is produced using a segmenting algorithm.

As used herein, the term "hash" refers to an identification of a chunk that is created using a hash function.

As used herein, the term "hook" refers to a hash of a chunk that has been sampled.

As used herein, the term "block" refers to a division of a file or data stream that is interleaved with other files or data streams. For example, interleaved data may comprise 1a, 2a, 3a, 1b, 2b, 1c, 3b, 2c, where 1a is the first block of underlying stream one, 1b is the second block of underlying stream one, 2a is the first block of underlying stream two, etc. In some cases, the blocks may differ in length.

As used herein, the term "deduplicate" refers to the act of logically storing a chunk, segment, or other division of data in a storage system or at a storage node in a way that there is physically only one (or, in non-ideal rare cares, a few) copy of each unique chunk at the system or node. For example, deduplicating ABC, DBC and EBF (where each letter represents a unique chunk) in turn against an initially-empty storage node results in only one physical copy of B but three logical copies.

For example, if a chunk is deduplicated against a storage location and the chunk is not previously stored at the storage location, then the chunk is physically stored at the storage location. However, if the chunk is deduplicated against the storage location and the chunk is already stored at the storage location, then the chunk is not physically stored at the storage location again. As yet another example, if multiple chunks are deduplicated against the storage location and only some of the chunks are already stored at the storage location, then only the chunks not previously stored at the storage location are physically stored at the storage location as part of the deduplication.

As used herein, the term "sticky routing" refers to a new data-storage routing algorithm that tends to store large continuous pieces of new data each at a single back-end node but deduplicates old data in small pieces, each against whichever back-end node it appears most similar to. In some cases, new segments are deduplicated against a currently designated "sticky" storage node, which is changed when enough new data is accumulated at the currently designated "sticky" storage node.

DETAILED DESCRIPTION

Figure 1A:
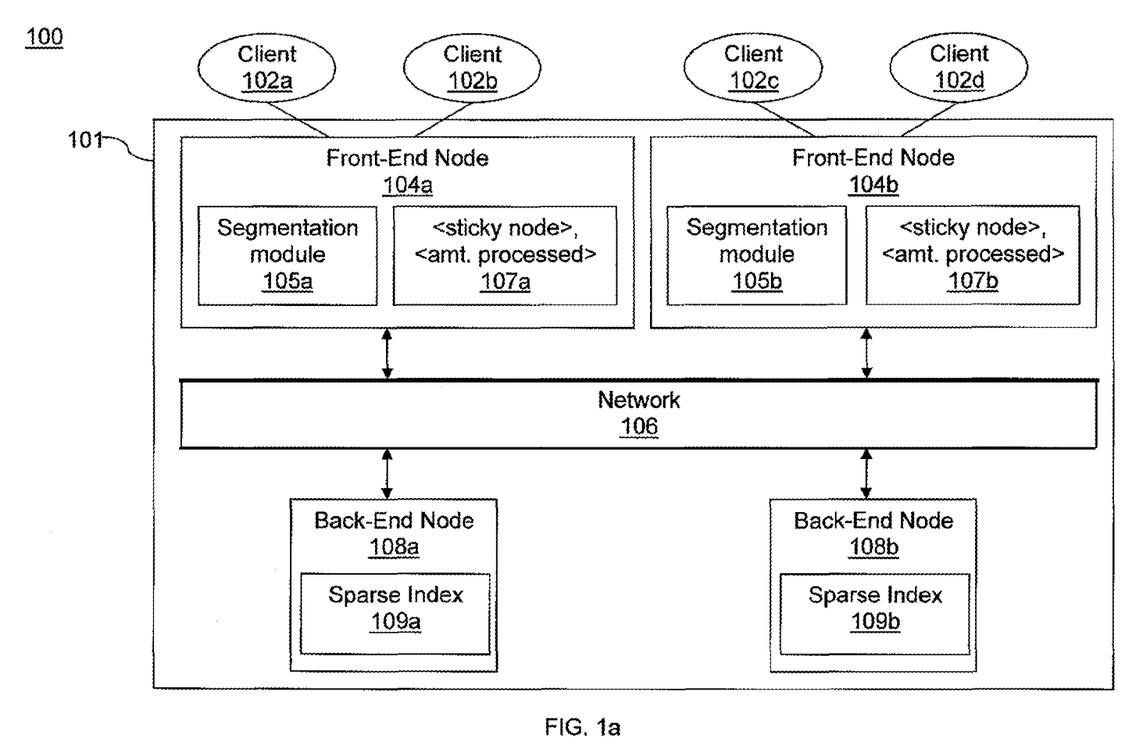
FIG. 1a shows a block diagram of a multi-node data deduplication system in accordance with various examples.

FIG. 1a shows an example multi-node deduplication architecture 100 including a storage system 101. Although described as using the sparse indexing method, the Bloom filter method as well as other methods of indexing may be alternately used. The multi-node architecture 100 comprises a client 102a coupled to a front-end node 104a. Additional clients 102b, 102c, 102d and additional front-end node 104b are shown as an example, although other examples do not require multiple clients or front-end nodes. In the case where there are multiple clients and/or front-end nodes, the clients possess functionality similar to exemplary client 102a and the front-end nodes possess functionality similar to exemplary front-end node 104a; in other words, the functionality described herein may be carried out by multiple clients and front-end nodes operating in parallel. In some cases, the association between clients 102a-d and front-end nodes 104a, 104b may change over time.

Figure 1B:
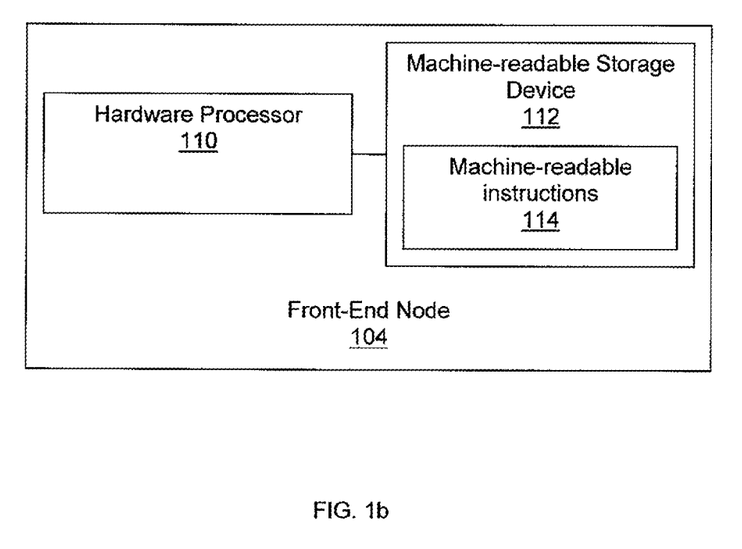
FIG. 1b shows an example architecture of a front-end node in accordance with various examples.

The client 102a may comprise a service requester in a typical client-server network and the front-end node 104a may comprise a processing unit and other functional elements of a server that provides resources or services to the client 102a. Additionally, the front-end node 104a may couple to or include a machine-readable storage device 112 (as shown in FIG. 1b), such as a compact disc, floppy disc, flash-based storage, or other non-transitory storage device. The front-end node 104a may execute instructions contained on the machine-readable storage device 112 and, as a result, perform various functions described below.

The front-end node 104a is shown comprising a segmentation module 105a. The segmentation module 105a performs chunking and segmentation algorithms to chunk and segment incoming data streams received from the clients 102a and 102b. In some cases, the chunking algorithm may define chunks by physical layer constraints (e.g., 4-kilobyte chunk size in Write Anywhere File Layout (WAFL)) while in other cases, chunks may be defined using a "sliding block" algorithm where a window is passed along the data stream to identify more naturally-occurring internal file boundaries. The segmenting algorithm groups chunks into segments and may select segment boundaries in a way that is similar to how a chunking algorithm might select chunk boundaries. For example, segment boundaries may be based on size (e.g., 10-megabyte segments) or based on more naturally-occurring or logical chunk boundaries. In alternate examples, the segmentation module 105a may reside locally or partially locally at the clients 102a-b. In these examples, the clients 102 send chunks, hashes, and/or segments, rather than a byte-oriented data stream, to the front-end node 104a.

The front-end node 104a is coupled to a plurality of back-end nodes 108 through one or more networks 106. The network 106 may comprise a high-speed bus known in the art and the back-end nodes 108 may comprise or be coupled to non-volatile storage devices, such as hard disk drives, solid state drives, and the like. The network 106 allows routing of requests, data streams, chunks, segments and the like from the front-end node 104a to one or more of the back-end nodes 108, for example to backup the data stream. One skilled in the art appreciates that a data stream may comprise files, images, virtual tape images, database backups, documents, and the like.

In some examples, the client 102a desires to deduplicate a data stream produced by a backup agent. The client 102a sends the data stream to the segmentation module 105a of the front-end node 104a, which subsequently chunks and segments the data stream. The front-end node 104a computes hashes for each chunk of each segment and, because this example uses the sparse indexing method, computes the hooks for each segment by sampling the hashes of the chunks of each segment. The sampled hashes that make up the hooks are referred to as "hook hashes." Alternately, the client 102a chunks and segments the data (e.g., using a local segmentation module) and computes hashes for each chunk of each segment and computes the hooks for each segment, similar to above. Alternately, the client 102a chunks and sends the hashes of each chunk to the front-end node 104a and the front-end node 104a performs the segmentation and hook selection. Other divisions of these tasks may be equivalently used.

As explained above, the storage system 101 uses an architecture where each segment of incoming data is deduplicated against only one relatively autonomous back-end node. Under this architecture, it is important that each segment with a significant number of old chunks be deduplicated against a back-end node that contains most of its old chunks. One way of doing this for segments containing old data is to conduct an auction where each back-end node "bids" based on how likely the back-end node thinks it is to deduplicate the segment well.

Each back-end node 108 maintains an associated sparse index 109 that maps the hooks of segments stored at that particular back-end node to indexes containing information about those hooks (not shown). To ensure that an incoming segment is deduplicated against the most appropriate back-end node 108, the front-end node 104a broadcasts the computed hook hashes for each segment of the data stream to the back-end nodes 108.

Although described with reference to deduplicating one segment, in practice segments can be either deduplicated one after the other or with some degree of parallelism (e.g., a pipeline might be used with one or more segments in each stage). Each back-end node 108 returns a bid to the front-end node 104a for the given segment. The bid may consist of the number of hooks of the given segment that are found in that back-end node's sparse index. The greater the bid, the more likely that the given segment will deduplicate well (e.g., require minimal physical copying) against that back-end node.

Then, based on the bids received from the back-end nodes 108, the front-end node 104a sends the remaining hashes of the given segment to the back-end node 108 that generated the highest bid (for simplicity in the following discussion, assume that 108a has generated the high bid). The bid may be the number of hook hashes that occur in the sparse index 109 of that back-end nodes 108 or may be another indication of whether the given segment is likely to deduplicate well against that back-end node.

If the Bloom filter method were being used in this example architecture, then the sparse indexes 109 would be replaced by a Bloom filter and a full chunk index. Additionally, the hooks might be all the given segment's hashes and the bid might consist of the number of hooks found in the relevant Bloom filter.

The high bidding back-end node (108a) then determines which of the remaining hashes and the hook hashes it does not already have corresponding chunks stored for and informs the front-end node 104a of the hashes for the chunks that are not stored. This determination may occur, for example, by comparing the hashes to one or more indexes found by looking up the hooks in its sparse index 109. The Bloom filter method would be similar, except that the hooks may be looked up in the full chunk index if they are not found in any available cached indexes.

If the front-end 104a has performed the chunking and segmenting, the front-end node 104a sends the chunks that are indicated as not stored to the back-end node 108a, which then stores those chunks. If the client 102a has performed the chunking and segmenting, the front-end node 104a relays the hashes for the chunks that are not stored at the back-end node 108a to the client 102a and the client 102a sends the chunks that are indicated as not stored to the front-end node 104a, which forwards those chunks to the back-end node 108a for storage. Alternatively, the back-end node 108a may communicate directly with client 102a, bypassing the front-end node 104a.

If no non-zero bids are received, the segment is most likely new data, and thus may be deduplicated against, for example, the least-loaded back-end node 108 (i.e., the back-end node having the most available storage space). Additionally, where bids are equal between back-end nodes 108, the segment may be stored at the least-loaded back-end node 108 of the nodes with equal bids. Furthermore, if the bids are equal and the back-end nodes 108 are equally loaded, the segment may be stored at a randomly-selected or rotating back-end node 108 of the back-end nodes with the highest bids.

The above deduplication scheme is an example of how a data stream from a client 102a may be deduplicated against back-end nodes 108. Each segment of the data stream may be routed to (i.e., deduplicated against) a different back-end node 108. However, other data deduplication schemes may be similarly employed and are applicable to examples given in the present disclosure. Additionally, as explained above, reference is made to the client 102a and the front-end node 104a for simplicity; however, the clients 102b, 102c, 102d and the front-end node 104b possess the same or similar functionality as the client 102a and the front-end node 104a.

FIG. 1b shows an example of a portion of the hardware architecture of the front-end node 104a. The front-end node 104a comprises one or more hardware processors 110 coupled to a machine-readable storage device 112. The machine-readable storage device 112 may comprise a hard drive, a compact disc, floppy disc, flash-based storage, or other non-transitory storage device. The machine-readable storage device 112 includes machine-readable instructions 114 that, when executed by the hardware processor 110, cause the hardware processor 110 to carry out some or all of the various functionality and/or methods (e.g., method 300 of FIG. 3) described herein. Similar hardware architecture may be implemented at the front-end node 104b, the clients 102a-102d, and the back-end nodes 108.

In some cases, each client 102 may generate interleaved or multiplexed data to be backed up at the storage system 101 shown in FIG. 1a (e.g., the data stream that results from dumping an SQL Server® database). Effective data deduplication of interleaved data can be problematic when using solely the bid-based approach explained above.

Figure 2:
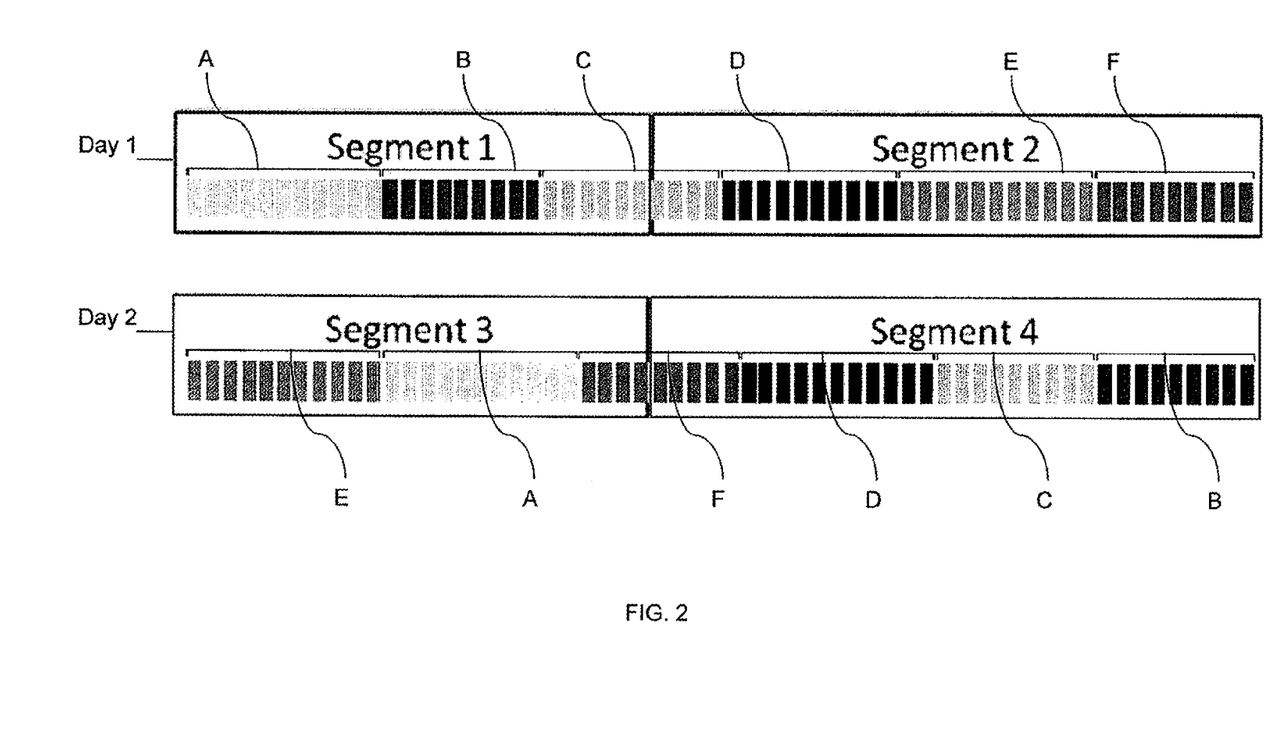
FIG. 2 shows an example diagram of interleaved data streams in accordance with various examples.

FIG. 2 shows an example of two interleaved data streams backed up on different days. The shaded portions A-F represent, for example, blocks from different underlying data streams being interleaved by a backup process, which may run on, for example, the client 102a. On day 1, the front-end node 104a receives the first data stream (labeled day 1) and chunks and segments blocks A, B, and a portion of C into Segment 1 and the remainder of block C and blocks D, E, and F into Segment 2. In some cases, the storage system 101 may be unaware of the block boundaries, which may only be known to the backup process.

To exemplify a potential inefficiency of a pure bid-based approach, assume that the front-end node 104a stores Segment 1 on back-end node 108a and stores Segment 2 on back-end node 108b. Subsequently, on day 2, the underlying data to be backed up remains the same or nearly the same (e.g., the underlying data streams being interleaved have not changed, or have changed only minimally). However, the blocks from the various underlying data streams are interleaved by the backup process in an order that is different from day 1, which is a common occurrence in data interleaving or multiplexing processes. As a result, the front-end node 104a receives the blocks and chunks and segments blocks E, A, and a portion of F into Segment 3 and the remainder of block F and blocks D, C, and B into Segment 4. Thus, Segment 3 and Segment 4 each contain data that has been previously stored across both back-end nodes 108. This results in poor data deduplication when storing Segment 3 on either back-end node 108a or 108b, despite the similarity between the blocks stored on day 1 and the blocks stored on day 2, because only a fraction of that segment is found on either back-end node 108. A similar problem exists with respect to Segment 4.

In accordance with various examples, the front-end node 104a employs a "sticky routing" method, which improves subsequent deduplication performance by grouping large amounts of new contiguous interleaved data on each of the various back-end nodes 108. Referring still to FIG. 2, when Segment 1 and Segment 2 are stored on day 1, it is advantageous to ensure that they are stored on the same back-end node, for example back-end node 108a. If Segments 1 and 2 are initially stored on back-end node 108a, then on day 2 when Segment 3 is to be stored, the above bid-based approach would cause the front-end node 104a to deduplicate Segment 3 against back-end node 108a. This results in no additional chunks being physically stored at back-end node 108a because blocks E, A, and a portion of F are already stored on back-end node 108a. Thus, minimal new data is stored at the back-end node 108a on day 2 when the back-end node 108a deduplicates Segment 3 against the back-end node 108a.

To facilitate sticky routing of incoming data streams, the front-end nodes 104a, 104b have values including a "bid threshold" and a "sticky threshold." The bid threshold is an example of a mechanism used to determine whether a segment is likely to deduplicate poorly against every back-end node 108 (i.e., the segment is likely mostly new data). The sticky threshold is an upper limit on an amount of data that is processed before the back-end node 108 currently designated as the sticky node is changed. The front-end nodes 104a, 104b also may maintain data structures 107a, 107b that store a "sticky node" and an "amount processed" value. The sticky node designates the current back-end node 108 against which new data should be deduplicated.

The amount processed in one example may be the amount of data deduplicated against the current sticky node since it most recently became the current sticky node. Alternatively, in another example, the amount processed may be the amount of data physically added to the current sticky node due to data being deduplicated against it since it most recently became the current sticky node. Alternatively, in another example, the amount processed may simply be the amount of data deduplicated against any back-end node since the current sticky node most recently became the current sticky node. Many other variants are possible; for example, the amount processed may only include new mostly-new segments.

When multiple input data streams are being processed at once, there may be one data structure 107a for each input data stream currently being processed by front-end 104a and the amount processed value associated with a given stream may refer only to data that is part of that stream. Thus, different streams may have different sticky nodes, which are switched at different times. Although generally described as operating on only one stream, the system may normally be operated with many streams being processed at a time.

One skilled in the art appreciates that, in general, the amount of data processed provides an indication of how much new data has been recently stored at the back-end node 108 currently designated as the sticky node and thus provides a way to gauge when a new back-end node 108 should be designated as the current sticky node. Other methods of determining when to designate a new back-end node 108 as the sticky node are within the scope of the present disclosure.

The bid threshold may be determined experimentally, but generally should be a low number that would indicate whether a particular segment is likely to deduplicate poorly against one of the back-end nodes 108. If the bid threshold is 2, for example, then a bid of 1 or 0 from a back-end node 108 for a segment should indicate that the segment is not likely to deduplicate well against that back-end node 108 and a bid of 3 or more should indicate that the segment is likely to deduplicate at least to some degree against the back-end node 108.

Alternately, rather than being an integer value, the bid threshold may be a percentage value (i.e., a percent threshold of the number of chunks being deduplicated). For purposes of simplicity, the case where the bid is equal to the threshold is not discussed as the actual bid threshold may simply be adjusted to provide for the correct outcome.

The sticky threshold should be larger than the maximum likely distance that two initially adjacent blocks from differently underlying streams will move apart in future days. For example, in practice this value may be less than about 10 gigabytes, so the degree to which an initial segment of interleaved data can "smear out" in size in later days is limited. Thus, the data of a future segment comes from a similarly limited section of the original data. If the sticky threshold is set to be larger than this size (e.g., 50 gigabytes), then it is likely that all or most of the data of the future segment will be originally stored at one back-end node. The bidding process explained above ensures that that back-end node is found successfully in most cases. However, even where the segment is spread across two back-end nodes, bidding helps to ensure that deduplication occurs against the back-end node having a larger amount of the segment. In some cases, the sticky threshold may vary based on the load (i.e., available storage space) of one or more of the back-end nodes 108.

The designated sticky node may change over time, for example as the data processed reaches the sticky threshold. At that point, the designated sticky node may be changed and the amount processed reset to zero. Initially, before data has been stored at the back-end nodes 108, the sticky node may be arbitrarily set.

Figure 3:
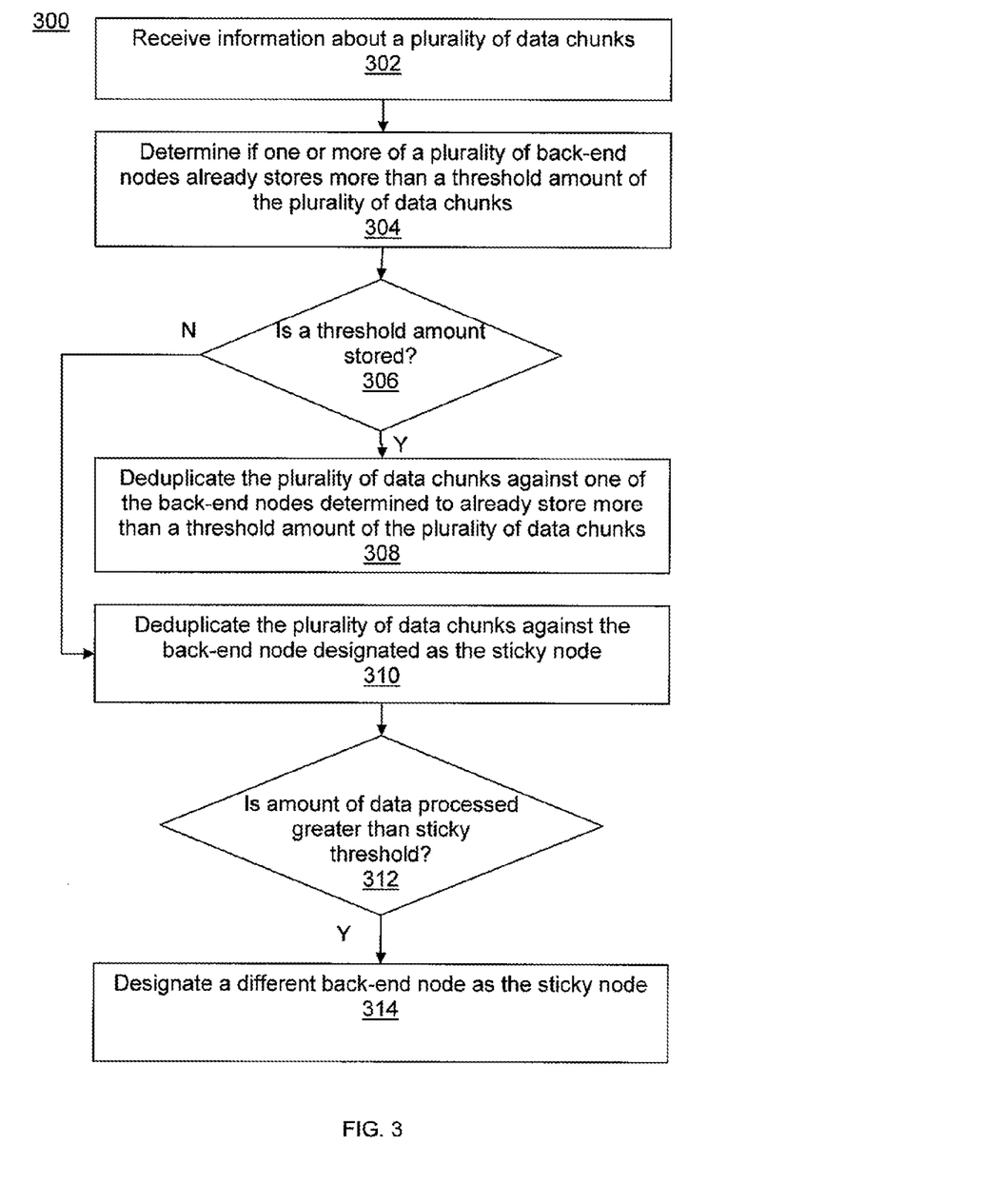
FIG. 3 shows a method flowchart in accordance with various examples.

FIG. 3 shows an illustrative method 300 for sticky routing of a data stream. In some cases, the method 300 may be performed by one or more hardware processors executing machine-readable instructions as shown in FIG. 1b. Additionally, various steps of the method may be performed by the clients, front-end nodes, and back-end nodes of FIG. 1a and may be performed in an order different than that shown. The method 300 begins with receiving information about a plurality of chunks (block 302). The information may be received from, for example, a segmentation module running on a client 102 or a front-end node 104 and may comprise hashes, hooks, or a combination thereof including other chunk identifying information.

The method 300 continues with determining if one or more of a plurality of back-end nodes 108 already stores more than a threshold amount of the plurality of data chunks (block 304). As explained above, this may be determined by broadcasting the hooks associated with the plurality of data chunks to all of the back-end nodes, receiving bids from each of the back-end nodes, and comparing the bids to a bid threshold. The determination may be made in the affirmative if any of the bids exceeds the bid threshold. In particular, a back-end node 108 may be determined to already store more than a threshold amount of the plurality of data chunks if its bid exceeds the bid threshold. The bid threshold may be absolute (e.g., did the bid exceed 2?) or relative (e.g., were at least 5% of the hooks found?).

Each back-end node 108 may generate its bid by accessing one or more indexes or filters. For example, its bid may consist of the number of the broadcast hooks that it finds in its sparse index or Bloom filter. The bid may be weighted, for example, by how much space that back-end node has left.

In another example, the determination may be made by accessing one or more indexes or filters associated with the plurality of back-end nodes 108 without doing a broadcast. For example, copies of the back-end nodes' Bloom filters might be available on each front-end node 106. In some cases, the determining may be done via heuristics and thus may not always be correct. For example, storage system 101 may incorrectly conclude that a segment is new because the hashes of its old chunks were not chosen as hooks.

If it is determined that at least a threshold amount of the plurality of data chunks is already stored at a back-end node 108 (block 306), then the plurality of data chunks are deduplicated against one of the back-end nodes 108 that has been determined to already store more than the threshold amount of the plurality of data chunks (block 308) and the method 300 ends. There are many ways to select the back-end node 108 of those exceeding the threshold to deduplicate the given segment against. For example, one of the plurality of back-end nodes 108 that has been determined to already store the most of the plurality of data chunks may be chosen. This might be done by choosing one of the back-end nodes 108 returning the highest bid value.

However, if it is determined that none of the plurality of back-end nodes 108 already stores more than the threshold amount of the plurality of data chunks (block 306), then the plurality of data chunks are mostly new chunks that have not been previously stored. Thus, the method 300 continues with deduplicating the plurality of data chunks against the back-end node 108 designated as the sticky node (block 310).

It is desirable for effective load-balancing that not all new data be sent to the same back-end node 108. Thus, the method 300 continues with comparing the amount of data processed value to the sticky threshold (block 312). If the amount of data processed is less than or equal to the sticky threshold, then the current sticky node should store more new data and thus the method ends.

However, if the amount of data processed is greater than the sticky threshold, then a different back-end node 108 is designated as the sticky node (block 314) and the method ends. Other methods responsive to an amount of data being processed than using a simple sticky threshold for determining when to change the designated sticky node may be similarly employed.

Rather than recalculating the current amount of data processed value each time it is needed, the storage system 101 may maintain the current amount of data processed value as data is processed. That is, as data is processed, the amount of data processed value may be updated appropriately.

The current amount of data processed value may be reset to zero when the current designated sticky node is changed; this causes the amount of data processed to comprise only data processed since the currently designated sticky node last became the designated sticky node. In one example, when data is deduplicated against the currently designated sticky node, the size of that data is added to the amount currently processed value. In this case, the amount of data processed comprises only data that has been deduplicated against the currently designated sticky node. It may in fact be the amount of data that has been deduplicated against the currently designated sticky node since the currently designated sticky node last became the designated sticky node.

In another example, when data is deduplicated against the currently designated sticky node, only the size of the portion of that data that has been physically added to the currently designated sticky node is added to the amount of data processed value. In this case, the amount of data processed comprises only data that has been physically added to the currently designated sticky node. It may in fact be the amount of data that has been physically added to the currently designated sticky node since the currently designated sticky node last became the designated sticky node. In another example, when data is deduplicated against any back-end node 108, the size of that data is added to the amount of data processed value. It may in fact be the amount of data that has been deduplicated since the currently designated sticky node last became the designated sticky node.

There may be multiple back-end nodes beyond the two shown in FIG. 1a. In such a situation, when selecting a new back-end node to be the currently designated sticky node, a choice must be made. The least-loaded back-end node (e.g., the back-end node having the most available storage space) may be selected, or, if there are a number of least-loaded back-end nodes, the updated sticky node may be selected at random from the least loaded back-end nodes. Alternatively, back-end nodes 108 may be selected in a round robin manner, where the back-end node least-recently designated as the sticky node is chosen next. Many other methods exist; generally speaking, the more lightly loaded and least recently used backend nodes should be preferred.

When multiple data streams are being processed at once (I.e., multiple instances of method 300 occurring in parallel), certain additional considerations come into play. In particular, it is useful to load balance across back-end nodes 108 so that not all streams are sending new data to the same back-end node 108 at once. One way to do this is to "penalize" nodes that are currently the designated sticky node for some other data stream; the penalty may depend on how many such streams that node is the currently designated sticky node for.

For example, an effective available storage space could be computed for each back-end node 108 by subtracting from its total available storage space both its storage space already used and the amount of storage space "reserved" on it by existing data streams, where a data stream "reserves" on its currently designated sticky node an amount of space equal to the sticky threshold minus its amount processed value. The storage system 101 might choose the next back-end node 108 to use as a sticky node by choosing among the back-end nodes 108 with the highest effective available storage space and breaking ties by least recently used. In some examples, the same back-end node 108 might be chosen as the new designated sticky node as the old designated sticky node if it is the node with by far the most available space.

The above method 300 enables large contiguous pieces of new data to be stored, each at a single back-end node. In the case where the data being stored is interleaved, the limited reordering of blocks during subsequent data interleaving (e.g., on subsequent days) has a reduced impact on the efficiency of data deduplication because the block portions contained in a segment are likely to be found at a single back-end node 108. More likely, the storage system 101 is likely to determine that the back-end node is the best back-end node to deduplicate that segment against, resulting in enhanced deduplication performance.

As explained above, the data deduplication system may be expanded to include multiple back-end nodes while effectively distributing interleaved data to improve deduplication performance, thereby minimizing the amount of storage space consumed during data backup procedures. Furthermore, bid-based schemes for distributing segments that are not new may be employed in a manner that is consistent with single back-end node data deduplication and backup systems.

The above discussion is meant to be illustrative of the principles and various examples of the present invention. Numerous variations and modifications will become apparent to those skilled in the art once the above disclosure is fully appreciated. For example, determining whether data is stored at a back-end node may comprise determining whether the data is actually present at the back-end node or, for example in a process using a Bloom filter, which may return a false positive, determining whether it is likely that the data is present at the back-end node. Other methods of determining whether data is or is likely to be stored at a back-end node are apparent to one skilled in the art. It is intended that the following claims be interpreted to embrace all such variations and modifications.

What is claimed is:
1. A method, comprising:
periodically designating one of a plurality of back-end nodes of a storage system as a sticky node for a specified term that persists until a specified amount of data has been processed;
receiving information about a plurality of data segments that are to be stored in the storage system;
for each of the plurality of data segments, determining a bid value for each of the plurality of back-end nodes based on how many data chunks from the respective data segment are already stored in the respective back-end node;
identifying as deemed-new data segments those ones of the plurality of data segments whose bid values are all less than a threshold amount,
sending all non-duplicate data chunks of each of the deemed-new data segments to the currently designated sticky node for storage therein; and
responsive to the specified term for the currently designated sticky node ending, designating a different one of the plurality of back-end nodes as the sticky node.

2. The method of claim 1 further comprising, for each of the plurality of data segments, accessing one or more indexes or filters associated with the plurality of back-end nodes to determine how many data chunks from the respective data segment are stored in each of the plurality of back-end nodes.

3. The method of claim 1,
wherein the specified amount of data is an amount of data processed by the currently designated sticky node since being designated as the sticky node.

4. The method of claim 1,
wherein designating a different one of the plurality of back-end nodes as the sticky node further comprises designating the one of the plurality of back-end nodes that currently has the greatest available storage space as the sticky node or designating as the sticky node the one of the plurality of back-end nodes that was least-recently designated as the sticky-node.

5. The method of claim 1 further comprising,
responsive to the specified term for the currently designated sticky node ending and more than one of the plurality of back-end nodes having the greatest available storage space, designating one of the back-end nodes having the greatest available storage space as the sticky node.

6. The method of claim 1 further comprising,
for each of the plurality of data segments that is not one of the deemed-new data segments, deduplicating the respective data segment against one of the plurality of back-end nodes whose bid value for the respective data segment is more than the threshold amount.

7. The method of claim 6 further comprising,
for each of the plurality of data segments that is not one of the deemed-new data segments, deduplicating the respective data segment against one of the plurality of back-end nodes whose bid value for the respective data segment is the highest among the bit values for the respective data segment.

8. The method of claim 1 wherein the amount of data processed comprises only data processed since the currently designated sticky node last became the designated sticky node.

9. The method of claim 1 wherein the amount of data processed comprises only data that has been deduplicated against the currently designated sticky node.

10. The method of claim 1 wherein the amount of data processed comprises only data that has been physically added to the currently designated sticky node.

11. A system, comprising:
a front-end node that comprises a processor; and
a plurality of back-end nodes coupled to the front-end node by way of a bus;
the front-end node to:
periodically designate one of the plurality of back-end nodes as a sticky node for a specified term that persists until a specified amount of data has been processed;
receive information about a plurality of data segments that are to be stored in the system;
for each of the plurality of data segments, identify the respective data segment as a deemed-new data segment if none of the plurality of back-end nodes already stores more than a threshold amount of data chunks from the respective data segment;
send all non-duplicate data chunks of each deemed-new data segment to the currently designated sticky node for storage therein; and
responsive to the specified term for the currently designated sticky node ending, designate a different one of the plurality of back-end nodes as the sticky node.

12. The system of claim 11 wherein when the front-end node designates a different one of the plurality of back-end nodes as the sticky node, the front-end node designates the one of the plurality of back-end nodes having the greatest available storage space as the sticky node or designates as the sticky node the one of the plurality of back-end nodes least-recently designated as the sticky-node.

13. The system of claim 11 wherein the front-end node is configured to, responsive to an amount of data processed being greater than a sticky threshold and more than one of the plurality of back-end nodes having the greatest available storage space, designate one of the plurality of back-end nodes having the greatest available storage space as the sticky node.

14. The system of claim 11 wherein the front-end node is configured to, for each of the plurality of data segments, responsive to a determination that one or more of the plurality of back-end nodes already stores more than the threshold amount of data chunks from the respective data segment, deduplicate the respective data segment against one of the plurality of back-end nodes that has been determined to already store more than the threshold amount of data chunks from the respective data segment.

* * * * *